United States Patent
Zhang et al.

(10) Patent No.: US 12,275,672 B2
(45) Date of Patent: Apr. 15, 2025

(54) METHODS, SYSTEMS FOR DEHYDRATING GASIFICATION FINE SLAGS, AND MEDIA THEREOF

(71) Applicant: CHINA UNIVERSITY OF MINING AND TECHNOLOGY, Jiangsu (CN)

(72) Inventors: Yixin Zhang, Xuzhou (CN); Jianjun Wu, Xuzhou (CN); Yangchun Xi, Xuzhou (CN); Manman Xue, Xuzhou (CN); Yan Li, Xuzhou (CN); Fanhui Guo, Xuzhou (CN)

(73) Assignee: CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 0 days.

(21) Appl. No.: 18/467,713

(22) Filed: Sep. 14, 2023

(65) Prior Publication Data

US 2024/0308909 A1    Sep. 19, 2024

(30) Foreign Application Priority Data

Mar. 15, 2023    (CN) .......................... 202310245934.0

(51) Int. Cl.
*C04B 18/06*    (2006.01)
*C01B 32/05*    (2017.01)
(Continued)

(52) U.S. Cl.
CPC ............ *C04B 18/065* (2013.01); *C01B 32/05* (2017.08); *C02F 1/008* (2013.01); *C02F 11/122* (2013.01);
(Continued)

(58) Field of Classification Search
CPC ......... C04B 18/065; C04B 5/06; C01B 32/05; C02F 1/008; C02F 11/122; C02F 11/13;
(Continued)

(56) References Cited

U.S. PATENT DOCUMENTS 3,579,442 A    5/1971    Gerwig

FOREIGN PATENT DOCUMENTS

CN    101776370 A    7/2010
CN    106029199 A    10/2016
(Continued)

OTHER PUBLICATIONS

CN-213141451-U abstract (Year: 2021).*
Decision to Grant a Patent in Chinese Application No. 202310245934.0 mailed on Apr. 17, 2024, 6 pages.
Du, Jie et al., Experimental Study on the Fundamental Combustion Characteristics of Fine Slag From Gasification, Clean Coal Technology, 25(2): 83-88, 2019.

*Primary Examiner* — Randy Boyer
*Assistant Examiner* — Juan C Valencia
(74) *Attorney, Agent, or Firm* — Porus IP LLC

(57) ABSTRACT

The present disclosure provides a method, a system for dehydrating a gasification fine slag, and a medium thereof. The method is performed by a processor controlling a dehydration device or a detection device, and the detection device is configured to detect at least one of physical properties or chemical properties of a gasification fine slag to be dehydrated. The method includes controlling the detection device to determine characteristic parameters of the gasification fine slag to be dehydrated, and determining a judgmental characteristic index of a dehydration moder of the gasification fine slag to be dehydrated. The method includes determining a target dehydration device and controlling the target dehydration device to dehydrate the gasification fine slag to be dehydrated. The method further includes controlling the detection device to determine a residual moisture content of a dehydrated gasification fine slag, and determining whether to end a dehydration task.

5 Claims, 5 Drawing Sheets

(51) Int. Cl.
  *C02F 1/00* (2023.01)
  *C02F 11/122* (2019.01)
  *C02F 11/13* (2019.01)
  *C02F 11/15* (2019.01)
  *C02F 103/34* (2006.01)
  *C04B 5/06* (2006.01)

(52) U.S. Cl.
  CPC .............. *C02F 11/13* (2019.01); *C02F 11/15* (2019.01); *C04B 5/06* (2013.01); *C02F 2103/34* (2013.01); *C02F 2209/006* (2013.01); *C02F 2209/02* (2013.01)

(58) Field of Classification Search
  CPC .................. C02F 11/15; C02F 2103/34; C02F 2209/006; C02F 2209/02; F26B 20/00
  See application file for complete search history.

(56) References Cited

FOREIGN PATENT DOCUMENTS

| | | | |
|---|---|---|---|
| CN | 111392811 A | | 7/2020 |
| CN | 213141451 U | * | 5/2021 |
| CN | 113333171 A | | 9/2021 |
| CN | 113929276 A | | 1/2022 |
| JP | 2007229547 A | | 9/2007 |
| KR | 101889896 B1 | | 9/2018 |
| WO | 0226350 A1 | | 4/2002 |

* cited by examiner

100

```
┌─────────────────────────────────────────┐
│ Controlling the detection device to determine │
│ characteristic parameters of the gasification fine │
│ slag to be dewatered, and determining, a      │ ～ 110
│ judgmental characteristic index of a dehydration │
│ mode of the gasification fine slag to be      │
│ dewatered                                  │
└─────────────────────────────────────────┘
                    ↓
┌─────────────────────────────────────────┐
│ Determining, based on a predetermined    │
│ condition satisfied by the judgmental     │
│ characteristic index, a target dehydration device │ ～ 120
│ and controlling the target dehydration device to │
│ dehydrate the gasification fine slag to be │
│ dehydrated                               │
└─────────────────────────────────────────┘
                    ↓
┌─────────────────────────────────────────┐
│ Controlling the detection device to determine a │
│ residual moisture content of a dehydrated │
│ gasification fine slag, and determining, based │ ～ 130
│ on the residual moisture content, whether to │
│ end a dehydration task                   │
└─────────────────────────────────────────┘
```

FIG. 1

METHODS, SYSTEMS FOR DEHYDRATING GASIFICATION FINE SLAGS, AND MEDIA THEREOF

CROSS-REFERENCE TO RELATED APPLICATIONS

This application claims priority to Chinese Patent Application No. 202310245934.0, filed on Mar. 15, 2023, the entire contents of which are incorporated herein by reference.

TECHNICAL FIELD

The present disclosure relates to the field of coal dehydration treatment technology, and in particular, to methods, systems for dehydrating gasification fine slags, and media thereof.

BACKGROUND

Coal still occupies a dominant position in China's energy mix to this day. Coal gasification technology is a key technology for clean conversion and efficient utilization of coal. During a coal gasification process, various physical and chemical transformations are performed on inorganic minerals, accompanied by a formation of solid slags consisting of residual carbon particles in the coal. These solid slags are carried out with the coal gas and removed by a wet deslagging process to form black water of gasification fine slag with a certain concentration. Currently, a gasification fine slag with high water content is mostly treated by simple landfilling. But this processing method is so crude that may pose a high risk of pollution to local soil and groundwater, which is seriously contrary to a theory of sustainable resource utilization. Therefore, it is urgent to propose a theory and a technology of dehydrating gasification fine slags efficiently.

At present, a plurality of dehydrating and upgrading processes have been developed at home and abroad, which are mainly divided into evaporative dehydration and non-evaporative dehydration. In the current evaporative dehydration technology, flue gas or other waste heat gas is often taken as a drying medium, which is in direct contact with materials so that moisture is evaporated, and removed in a gaseous form. Moisture in the materials can be completely removed by using the current evaporative dehydration technology. However, the gasification fine slag is a product of the coal gasification process, during which a large amount of heat exchange may occur, which has a heat supply base, and a complex operating environment for the evaporative dehydration of the gasification fine slag, causing a disadvantage of high cost.

A vacuum drying technology has a feature of low energy consumption and high efficiency. Due to a cavitation effect and a mechanical effect, an ultrasonic drying technology makes dry materials be stretched and compressed repeatedly to produce a sponge structure, making the moisture be easily transferred out. In addition, the ultrasonic drying may change the form of the material to form a tiny channel, so that a convection mass transfer rate is accelerated. Coupling and superposition of a vacuum field and an ultrasonic field may further improve dehydration efficiency of the gasification fine slag. However, too long a dehydration time may shorten the service life of a filter cloth, and too short a dehydration time may not meet dehydration requirements.

The principle of non-evaporative dehydration technology is to remove the moisture in the material in a liquid form using energy fields such as a concentration gradient, a high-speed centrifugation, an air pressure difference, a mechanical extrusion, and vibration dredging, which has great potential to be applied in the dehydration process of the gasification fine slag. A mechanical hot press dehydration technology couples a vibration force field with a temperature field. Under a certain mechanical pressure, a sliding internal friction angle and a friction force between particles are reduced, causing particle slippage and structural change, thus realizing a process of enhanced compaction and efficient dehydration. In this case, the temperature field plays an auxiliary role in increasing the temperature increases, and viscosity decreases, which is conducive to mass transfer. However, the method may only be efficient in removing the moisture within a certain range of moisture content. When the moisture content of the material is required to be less than 30%, the method may not be applicable.

There are unavoidable drawbacks in the dehydration process of each energy field unit, as well as a disadvantage of high energy consumption when using a single dehydration mode. Therefore, it is desirable to provide a method, a system, and a medium for dehydrating a gasification fine slag, which can integrate various dehydration modes used for different gasification fine slags, thereby reducing the moisture content of the gasification fine slags while minimizing energy consumption for dehydration.

SUMMARY

One of the embodiments of the present disclosure provides a method for dehydrating a gasification fine slag. The method may be performed by a processor controlling at least one of a dehydration device or a detection device. The detection device may be configured to detect at least one of physical properties or chemical properties of a gasification fine slag to be dehydrated. The method may include: controlling the detection device to determine characteristic parameters of the gasification fine slag to be dehydrated, and determining, based on the characteristic parameters, a judgmental characteristic index of a dehydration mode of the gasification fine slag to be dehydrated, the characteristic parameters including at least one of a moisture content, an average particle size, a pore volume, and a dry basis ash content. The method may further include: determining, based on a predetermined condition satisfied by the judgmental characteristic index, a target dehydration device and controlling the target dehydration device to dehydrate the gasification fine slag to be dehydrated. The method may further include: controlling the detection device to determine a residual moisture content of a dehydrated gasification fine slag, and determining, based on the residual moisture content, whether to end a dehydration task.

One of the embodiments of the present disclosure provides a system for dehydrating a gasification fine slag. The system may include a processor, and the processor may control at least one of a dehydration device or a detection device. The dehydration device may include at least one of at least one of an ultrasonically coupled vacuum dehydration device, a vibratory hot press dehydration device, and an ultrasonically coupled evaporative drying device. The detection device may be configured to detect at least one of physical properties or chemical properties of a gasification fine slag to be dehydrated. The processor may be configured to control the detection device to determine characteristic parameters of the gasification fine slag to be dehydrated. The processor may also be configured to determine, based on the characteristic parameters, a judgmental characteristic index of a dehydration mode of the gasification fine slag to be dehydrated. The characteristic parameters may include at least one of a moisture content, an average particle size, a pore volume, and a dry basis ash content. The processor may also be configured to determine, based on a predetermined condition satisfied by the judgmental characteristic index, a target dehydration device and control the target dehydration device to dehydrate the gasification fine slag to be dehydrated. The processor may be further configured to control the detection device to determine a residual moisture content of a dehydrated gasification fine slag, and determine, based on the residual moisture content, whether to end a dehydration task.

One of the embodiments of the present disclosure provides a non-transitory computer-readable storage medium storing computer instructions. When a computer reads the computer instructions in the storage medium, the computer may perform the method for dehydrating the gasification fine slag mentioned above.

BRIEF DESCRIPTION OF THE DRAWINGS

The present disclosure may be further illustrated by way of exemplary embodiments, which may be described in detail by means of the accompanying drawings. These embodiments are not limiting, and in these embodiments, the same numbering indicates the same structure, wherein:

FIG. 1 is a flowchart illustrating an exemplary method for dehydrating a gasification fine slag according to some embodiments of the present disclosure;

DETAILED DESCRIPTION

Figure 2:
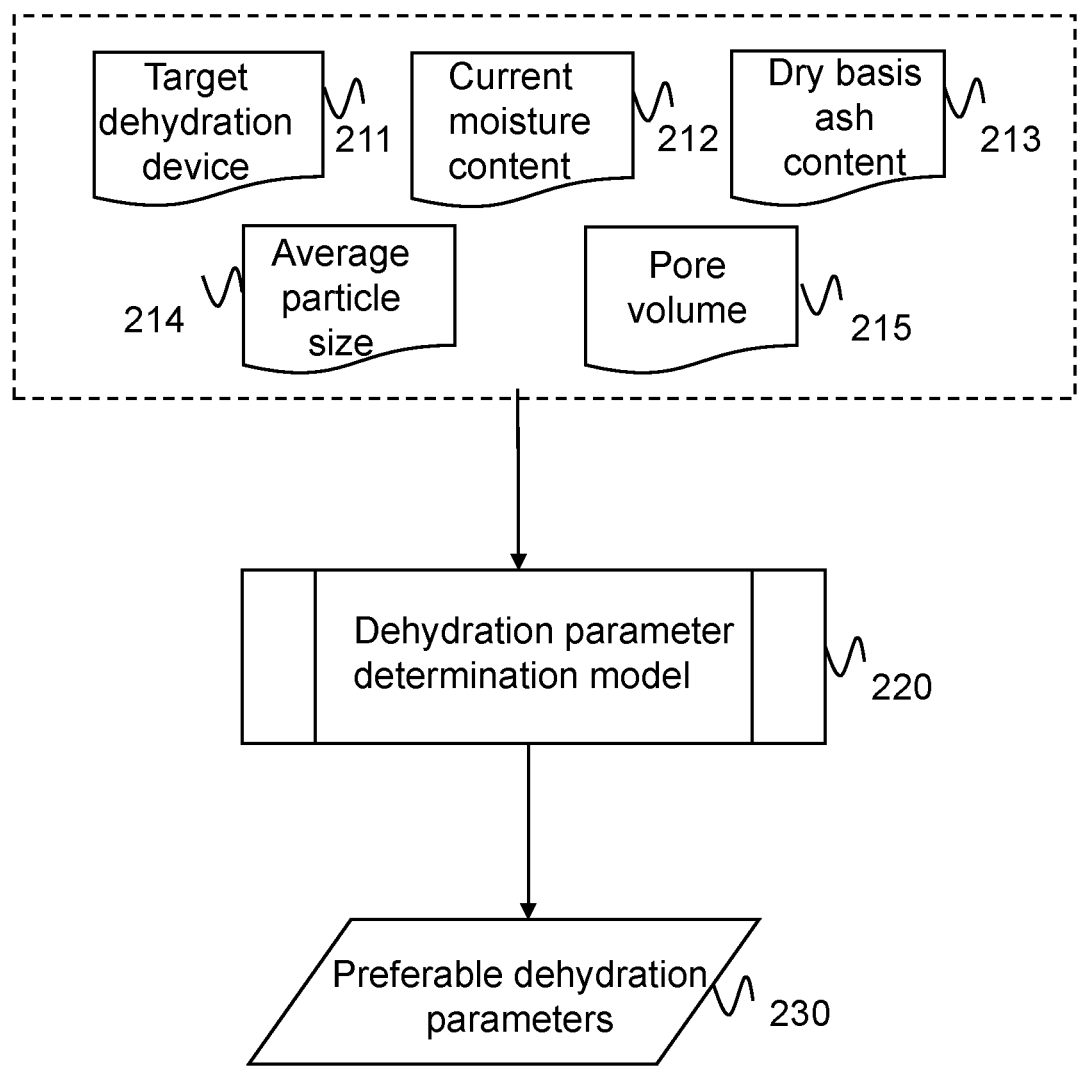
FIG. 2 is a schematic diagram illustrating an exemplary dehydration parameter determination model according to some embodiments of the present disclosure.

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system", "device", "unit" and/or "module" as used herein is a manner used to distinguish different components, elements, parts, sections, or assemblies at different levels. However, if other words serve the same purpose, the words may be replaced by other expressions.

The flowcharts used in the present disclosure illustrate operations that systems implement according to some embodiments of the present disclosure. It should be understood that the previous or subsequent operations may not be accurately implemented in order. Instead, each step may be processed in reverse order or simultaneously. Meanwhile, other operations may also be added to these processes, or a certain step or several steps may be removed from these processes.

FIG. 1 is a flowchart illustrating an exemplary method for dehydrating a gasification fine slag according to some embodiments of the present disclosure. As shown in FIG. 1, a process 100 may include the following operations. In some embodiments, the process 100 may be performed by a processor controlling a dehydration device and/or a detection device.

The dehydration device refers to a device for dehydrating a gasification fine slag to be dehydrated. In some embodiments, the dehydration device may include at least one of an ultrasonically coupled vacuum dehydration device, a vibratory hot press dehydration device, and an ultrasonically coupled evaporative drying device. The ultrasonically coupled vacuum dehydration device may combine an ultrasound force field and a vacuum force field to achieve rapid dehydration of a gasification fine slag using an ultrasonic vibration effect and a vacuum suction effect. During a treatment process, the processor may control dehydration parameters of a vacuum suction filter and an ultrasonic generator. The vibratory hot press dehydration device may rapidly dehydrate the gasification fine slag under hot pressing through mechanical vibration. The ultrasonically coupled evaporative drying device may make the gasification fine slag evaporate and dry at a high temperature to achieve a dehydration effect through a combined effect of ultrasound and heat.

The detection device refers to a device that may detect physical properties and/or chemical properties of the gasification fine slag to be dehydrated. The detection device may include a moisture meter, a particle size analyzer, etc.

In 110: the detection device may be controlled to determine characteristic parameters of the gasification fine slag to be dehydrated, and a judgmental characteristic index of a dehydration manner of the gasification fine slag to be dehydrated may be determined based on the characteristic parameters.

The gasification fine slag to be dehydrated refers to black water of a gasification fine slag with a certain concentration brought out with coal gas.

The characteristic parameters refer to relevant parameters used to represent the gasification fine slag to be dehydrated. In some embodiments, the characteristic parameters may include at least one of a moisture content, an average particle size, a pore volume, a dry basis ash content, etc. The characteristic parameters may affect dehydration performance of the gasification fine slag to be dehydrated. The dehydration performance refers to difficulty in removing moisture (or completely removing moisture) from the gasification fine slag to be dehydrated. The poorer the dehydration performance, the less likely the moisture may be removed. The higher the moisture content, the more water needs to be removed, and the higher the requirements for dehydration methods and conditions. The smaller the average particle size of the gasification fine slag, the larger the specific surface area, the larger the contact area of the particles combined with water, the larger the activation energy required to remove water, and the more difficult the dehydration. The pore volume refers to a total volume of internal voids of the gasification fine slag to be dehydrated. The smaller the pore volume, the lower the moisture content, but the more difficult the dehydration. The dry basis ash content refers to a proportion of a non-combustible part (mainly minerals) in a total mass of the gasification fine slag to be dehydrated in a completely dry state. An ash content of the gasification fine slag is mostly small spherical vitreous bodies that are hydrophobic and have simple surface structures. The higher the ash content, the easier the moisture to be removed, i.e., the better the dehydration performance.

In some embodiments, the processor may determine the characteristic parameters of the gasification fine slag to be dehydrated by controlling the detection device and/or through a detection method. The detection method refers to a method of detecting the physical properties and/or the chemical properties of the gasification fine slag to be dehydrated. For example, the processor may control the moisture meter to measure the moisture content of the gasification fine slag to be dehydrated. The processor may control the particle size analyzer to measure an average particle size of the gasification slag to be dehydrated. The detection method may include a gas adsorption method, a sintering method, etc. For example, the processor may measure a pore volume of the gasification fine slag to be dehydrated through the gas adsorption method (Barret Joyner Halenda, BJH). The processor may measure the dry basis ash content of the gasification fine slag to be dehydrated through the sintering method.

The judgmental characteristic index refers to a parameter used to determine the dehydration mode of the gasification fine slag to be dehydrated. The judgmental characteristic index may be expressed in a numerical value, a percentage, etc.

The dehydration mode refers to a specific mode used to dehydrate the gasification fine slag to be dehydrated. The dehydration mode may include the gasification fine slag to be dehydrated entering the ultrasonically coupled vacuum dehydration device for dehydration, the gasification fine slag to be dehydrated entering the vibratory hot press dehydration device for dehydration, and the gasification fine slag to be dehydrated entering the ultrasonically coupled evaporative drying device for dehydration.

In some embodiments, the processor may determine the judgmental characteristic index of the dehydration moder of the gasification fine slag to be dehydrated in a plurality of ways. For example, the processor may determine the judgmental characteristic index of the dehydration mode of the gasification fine slag to be dehydrated by means of vector retrieval based on the moisture content, the average particle size, the pore volume, and the dry basis ash content.

For example, the processor may construct a vector to be matched based on the moisture content, the average particle size, the pore volume, and the dry basis ash content, and obtain a reference vector whose vector distance from the vector to be matched satisfies a distance threshold by retrieving a vector database based on the vector to be matched to, and determine a historical judgmental characteristic index corresponding to the reference vector as the currently required judgmental characteristic index. The vector database may be used to store a plurality of historical vectors and historical judgment characteristic indexes corresponding to the plurality of historical vectors. The plurality of historical vectors may be constructed based on historical moisture contents, historical average particle sizes, historical pore volumes, and historical dry basis ash contents.

In some embodiments, the processor may obtain a detection result; and determine, based on the detection result obtained from the detection device, the judgmental characteristic index of the dehydration mode through a predetermined algorithm.

Descriptions regarding determining the characteristic parameters of the gasification fine slag to be dehydrated may be found in related descriptions hereinabove.

The detection result refers to characteristic parameters of the gasification fine slag to be dehydrated after measurement. The detection result may include the moisture content, the average particle size, the pore volume, and the dry basis ash content of the gasification fine slag to be dehydrated after measurement.

The predetermined algorithm refers to an algorithm used to determine the judgmental characteristic index. For example, the predetermined algorithm may include linear regression, empirical formula, Bayesian method, etc.

In some implementations, in the predetermined algorithm, the judgmental characteristic index that may be positively correlated with the moisture content, the average particle size, and the dry basis ash content, and the judgmental characteristic index that may be negatively correlated with the pore volume. The predetermined algorithm may be represented by a formula, a predetermined rule, etc. For example, the predetermined algorithm may be represented by the following formula (1). The processor may determine the judgmental characteristic index through formula (1).

$$x = \frac{W}{V}\left(\frac{D}{50}\right)^{1.16}\left(\frac{\text{Ash}}{0.6}\right)^{1.32} \qquad (1)$$

Where x denotes the judgmental characteristic index, which is a dimensionless quantity; W denotes the moisture content of the gasification fine slag to be dehydrated, i.e., a mass of contained moisture (g) or a total mass of the gasification fine slag to be dehydrated (g); D denotes the average particle size of the gasification fine slag to be dehydrated (μm); V denotes the pore volume of the gasification fine slag to be dehydrated ($cm^3$/g) measured by the BJH method; and Ash denotes the dry basis ash content of the gasification fine slag to be dehydrated (g/g).

In some embodiments, the judgmental characteristic index of the dehydration mode of the gasification fine slag to be dehydrated may be determined by the predetermined algorithm based on the characteristic parameters of the gasification fine slag to be dehydrated, which may improve accuracy of the determined judgmental characteristic index and make a subsequent determination of a suitable dehydration mode more accurate, thereby improving dehydration efficiency and reducing energy consumption.

In 120: a target dehydration device may be determined based on a predetermined condition satisfied by the judgmental characteristic index, and the target dehydrating device may be controlled to dehydrate the gasification fine slag to be dehydrated.

The predetermined condition refers to a condition used to determine the target dehydration device. For example, the predetermined condition may be that the judgmental characteristic index x is within a certain predetermined numerical range. The predetermined condition may be set artificially based on historical experience. In some embodiments, the processor may select a first dehydration mode corresponding to the gasification fine slag to be dehydrated from a predetermined database based on the predetermined condition. The predetermined database may be stored in the processor and/or other storage devices to which the processor is communicatively connected. The predetermined database may store the predetermined condition.

In some embodiments, the processor may determine preferable dehydration parameters of the ultrasonically coupled vacuum dehydration device or the vibratory hot press dehydration device through a dehydration parameter determination model. More details may be found in FIG. 2 and related descriptions thereof.

The target dehydration device refers to a device selected for dehydrating the gasification fine slag to be dehydrated based on the judgmental characteristic index. The target dehydration device may be one of the ultrasonically coupled vacuum dehydration device, the vibratory hot press dehydration device, and the ultrasonically coupled evaporative drying device.

In some embodiments, the processor may select a target detection device based on the predetermined condition satisfied by the judgmental characteristic index. The processor may control the target detection device to dehydrate the gasification fine slag to be dehydrated.

In some embodiments, the predetermined condition may include a first predetermined condition, a second predetermined condition, and a third predetermined condition.

The first predetermined condition refers to a condition that designates the target dehydration device as the ultrasonically coupled vacuum dehydrating device. In some embodiments, the first predetermined condition may be that the judgmental characteristic index is greater than a first segment value.

The first segment value refers to a value used to distinguish whether the target dehydration device is the ultrasonically coupled vacuum dehydration device or the vibratory hot press dehydration device. For example, if the judgmental characteristic index is greater than the first segment value, the target dehydration device may be the ultrasonically coupled vacuum dehydrating device. As another example, if the judgmental characteristic index is less than or equal to the first segment value and greater than a second segment value, then the target dehydration device may be the vibratory hot press dehydration device. Descriptions regarding the second segment value may be found in descriptions hereinafter.

In some embodiments, the processor may determine the first segment value and the second segment value through a segment parameter determination model. More details may be found in FIG. 3 and related descriptions thereof.

In some embodiments, in response to the judgmental characteristic index satisfying the first predetermined condition, the processor may determine the target dehydration device to be the ultrasonically coupled vacuum dehydration device, and control the ultrasonically coupled vacuum dehydration device to dehydrate the gasification fine slag to be dehydrated.

In some embodiments, the first segment value may be 7, and the processor may determine the target dehydration device to be the ultrasonically coupled vacuum dehydration device when the judgmental characteristic index satisfies the first predetermined condition, i.e., x>7. More descriptions may be found in FIG. 7 and related descriptions thereof.

In some embodiments, in response to the target dehydration device being the ultrasonically coupled vacuum dehydration device, the processor may control a vacuum degree of the vacuum suction filter of the ultrasonically coupled vacuum dehydration device to be greater than a predetermined vacuum degree (e.g., above 0.08 MPa, etc.). The processor may control service power of the ultrasonic generator of the ultrasonically coupled vacuum dehydration device to be within a range of 350 W-450 W (e.g., 400 W, etc.), and a single processing time of the ultrasonically coupled vacuum dehydration device to be within a range of 50 S-70 S (e.g., 60 S, etc.). The processor may control the ultrasonically coupled vacuum dehydration device including the device mentioned above to dehydrate the gasification fine slag to be dehydrated within a defined range.

When the target dehydration device is the ultrasonically coupled vacuum dehydration device, the vacuum degree of the vacuum suction filter, the service power of the ultrasonic generator, and the single processing time of the ultrasonically coupled vacuum dehydration device may be controlled to be within an appropriate range by the processor, so that the ultrasonically coupled vacuum dehydration device may maintain low energy consumption while improving an effect of dehydrating the gasification fine slag.

The second predetermined condition refers to a condition that designates the target dehydration device as the vibratory hot press dehydration device. In some embodiments, the second predetermined condition may be that the judgmental characteristic index is less than or equal to the first segment value and greater than the second segment value, and the first segment value is greater than the second segment value.

The second segment value refers to a value used to distinguish whether the target dehydration device is the vibratory hot press dehydration device or the ultrasonically coupled evaporative drying device. For example, if the judgmental characteristic index is less than or equal to the second segment value, the target dehydration device may be the ultrasonically coupled evaporative drying device. As another example, if the judgmental characteristic index is less than or equal to the first segment value and greater than the second segment value, then the target dehydration device may be the vibratory hot press dehydration device.

In some embodiments, in response to the judgmental characteristic index satisfying the second predetermined condition, the processor may determine the target dehydration device to be the vibratory hot press dehydration device and control the vibratory hot press dehydration device to dehydrate the gasification fine slag to be dehydrated.

In some embodiments, the second segment value may be 3, and when the judgmental characteristic index satisfies the second predetermined condition, i.e., $7 \geq x > 3$, the processor may determine the target dehydration device to be the vibratory hot press dehydration device. More descriptions may be found in FIG. 4 and related descriptions thereof.

In some embodiments, in response to the target dehydration device being the vibratory hot press dehydration device, the processor may control a mechanical vibration force pressure intensity of the vibratory hot press dehydration device to be within a range of 2 MPa-4 MPa (e.g., 3 MPa), a vibration frequency to be within a range of 18 Hz-22 Hz (e.g., 20 Hz, etc.), a mechanical static pressure intensity to be 8 MPa, and a single processing time of the vibratory hot press dehydration device to be within a range of 60 S-120 S (e.g., 90 S). The processor may control the vibratory hot press dehydration device including the device mentioned above to dehydrate the gasification fine slag to be dehydrated within a defined range.

When the target dehydration device is the vibration hot press dehydration device, the processor may control the mechanical vibration force pressure intensity, the vibration frequency, the mechanical static pressure intensity, and the single processing time to be within an appropriate range, so that the vibration hot press dehydration device may maintain low energy consumption while improving the effect of dehydrating the gasification fine slag.

The third predetermined condition refers a condition that designates the target dehydration device as the ultrasonically coupled evaporative drying device. In some embodiments, the third predetermined condition may be that the judgmental characteristic index is less than or equal to the second segment value.

In some embodiments, in response to the judgmental characteristic index satisfying the third predetermined condition, the processor may determine the target dehydration device to be the ultrasonically coupled evaporative drying device, and control the ultrasonically coupled evaporative drying device to dehydrate the gasification fine slag to be dehydrated. In some embodiments, when the judgmental characteristic index satisfies the third predetermined condition, i.e., x≤3, the processor may determine the target dehydration device to be the ultrasonically coupled evaporative drying device. More descriptions may be found in FIG. 4 and related descriptions thereof.

In some embodiments, where the target dehydration device is the ultrasonically coupled evaporative drying device, the processor may control a temperature of the ultrasonically coupled evaporative drying device to be within a range of 100° C.-110° C. (e.g., 100° C.). The detection device may be controlled to determine a residual moisture content of a current gasification fine slag every x1-x2 min (e.g., 10 min, etc.) by sampling until the moisture content reaches a set dehydration value, and an end of a dehydration task may be determined. The processor may control the ultrasonically coupled evaporative drying device to dehydrate the gasification fine slag to be dehydrated within a defined range mentioned above.

The current gasification fine slag refers to a gasification fine slag corresponding to a current time point.

The residual moisture content refers to a moisture content of the current gasification fine slag.

The set dehydration value refers to a set value that the moisture content (i.e. the residual moisture content) of the current gasification fine slag needs to reach. For example, the set dehydration value may be preset according to a requirement of a dehydration process or historical experience and manually input into the processor.

When the target dehydration device is the ultrasonically coupled evaporative drying device, the processor may control the temperature and an interval time in the appropriate range for sampling and determine the residual moisture content of the current gasification fine slag until the moisture content reaches the set dehydrating value and end the dehydration process, so that the ultrasonically coupled evaporative drying device may maintain low energy consumption while improving an effect of dehydrating the gasification fine slag, thereby ending the dehydration task timely and efficiently.

In some embodiments, when the target dehydration device is the ultrasonically coupled evaporative drying device, the processor may detect the residual moisture content of the current gasification fine slag based on a sampling interval; and determine a current sampling interval based on at least one historical residual moisture content and a historical sampling interval.

The sampling interval refers to a time interval between two adjacent times of sampling of the current gasification fine slag, e.g., every 10 min as described above. In some embodiments, the sampling interval may be determined according to a preset time table. For example, the preset time table may record a sampling interval between two sequential samplings. Each sampling interval may be equal or unequal.

The historical residual moisture content refers to a residual moisture content of the gasification fine slag corresponding to a historical time.

In some embodiments, the processor may detect the residual moisture content of the current gasification fine slag based on the sampling interval by the detection device (e.g., the moisture meter). For example, if a last sampling time of the current gasification fine slag is T, and sequentially, the sampling interval is t, then the processor may detect the residual moisture content of the current gasification fine slag by the detection device (e.g., the moisture meter) at time T+t, T+2t, etc. As another example, if the last sampling time of the current gasification fine slag is T, and sequentially, the sampling interval is t1, t2, etc., then the processor may detect the residual moisture content of the current gasification fine slag by the detection device (e.g., the moisture meter) at the time T+t1, T+t2, etc.

The historical sampling interval refers to a time interval of sampling the gasification fine slag at the historical time.

The current sampling interval refers to a time interval of sampling the current gasification fine slag next time.

In some embodiments, the processor may calculate a dehydration rate based on the at least one historical residual moisture content and the historical sampling interval. The dehydration rate refers to a ratio of a difference between historical residual moisture contents of two adjacent gasification fine slags to a corresponding historical time interval.

A plurality of dehydration rates may form a dehydration rate distribution in an order of time. For example, a plurality of collected and detected historical residual moisture contents of the gasification fine slag may be a1, a2, and a3, respectively, and collection time may be T1, T2, and T3, respectively, then corresponding dehydration rate distributions may be $$\frac{(a2-a1)}{(T2-T1)} \text{ and } \frac{(a3-a2)}{(T3-T2)}.$$

The processor may perform a stability verification (e.g., an ADF testing, etc.) on a time sequence composed of the dehydration rate distribution. If a verification result indicates that the time sequence composed of the dehydration rate distribution is stable (i.e., a confidence level is greater than a set confidence threshold), then the processor may calculate a sampling interval at which the residual moisture content of the current gasification fine slag reaches a set dehydration content according to the time sequence composed of the dehydrating rate distribution, and determine the current sampling interval based on the sampling interval. For example, the current sampling interval may be equal to, or slightly less than, the sampling interval at which the residual moisture content of the current gasification fine slag reaches the set dehydration content mentioned above. If the verification result indicates that the time sequence composed of the dehydration rate distribution is not stable (i.e., the confidence level is less than the set confidence threshold), the current sampling interval may follow the last historical sampling interval.

In some embodiments, when the target dehydration device is the ultrasonically coupled evaporative drying device, the moisture content of the gasification fine slag to be dehydrated at this time may be low, and the processor may continuously and effectively detect the residual moisture content of the gasification fine slag at intervals and obtain a change process of the residual moisture content of the gasification fine slag by determining the current sampling interval, thereby ensuring that the moisture content of the gasification fine slag reaches the set dehydration value to end the dehydration process in time, and improving dehydration efficiency and reducing energy consumption.

In some embodiments of the present disclosure, through the first predetermined condition, the second predetermined condition, and the third predetermined condition, the gasification fine slag may be dehydrated by selected different dehydration devices according to the predetermined condition satisfied by the judgmental characteristic index of the gasification fine slag, so that a dehydrating mode of a lowest energy consumption may be used for the gasification fine slag in every stage (i.e., when the gasification fine slag is of a different judgmental characteristic index). Compared to a single dehydration process, the moisture content of the gasification fine slag may be reduced to a target value (i.e., the set dehydration content), and energy consumption for dehydration may be reduced.

In 130: the detection device may be controlled to determine a residual moisture content of a dehydrated gasification fine slag, and whether to end a dehydration task may be determined based on the residual moisture content.

In some embodiments, the processor may control the detection device to determine the residual moisture content of the dehydrated gasification fine slag. The processor may compare the residual moisture content with the set dehydration value. In response to a comparison result meeting dehydration requirements, the dehydration task may be ended; or in response to the comparison result not meeting the dehydration requirements, the judgmental characteristic index of the dehydration mode may be obtained again; and the target dehydration device may be determined based on the predetermined condition satisfied by the judgmental characteristic index, and dehydration may be continued until the dehydrated gasification fine slag meets the dehydration requirements.

The comparison result refers to a result of comparing the residual moisture content of the dehydrated gasification fine slag with the set dehydration value. For example, the comparison result may be that the residual moisture content is less than, equal to, or greater than the set dehydration value.

The dehydration requirements may be requirements that the dehydration task on the gasification fine slag may be ended. In some embodiments, the residual moisture content of the dehydrated gasification fine slag may be less than or equal to the set dehydration value, and the processor may determine that the comparison result meets the dehydration requirements and end the dehydration task; otherwise, the processor may determine that the comparison result does not meet the dehydration requirements, and the processor may obtain the judgmental characteristic index of the dehydration mode again.

In some embodiments, in response to the comparison result not meeting the dehydration requirements, a mode for the processor to obtain the judgmental characteristic index of the dehydration mode again may be found as described above, which is not repeated here.

In some embodiments, the processor may determine the target dehydration device based on the predetermined condition satisfied by the judgmental characteristic index of the dehydration mode obtained again and continue dehydration again, and compare the residual moisture content of the dehydrated gasification fine slag again with the set dehydration value again; and in response to a re-comparison result meeting the dehydration requirements, the processor may end the dehydration task. Further, in response to the re-comparison result not meeting the dehydration requirements, the processor may continue to obtain the judgmental characteristic index of the dehydration mode; and continue in the same manner, until the dehydrated gasification fine slag meets the dehydration requirements.

In some embodiments, the dehydration process of the gasification fine slag may be flexibly adjusted by setting a specific dehydration value to ensure that an expected dehydrating effect is achieved, so as to avoid failure to meet actual requirements caused by excessive dehydration or insufficient dehydration of the gasification fine slag. After dehydration, the residual moisture content of the gasification fine slag may reach the set dehydration value, and the dehydration may be ended in time, thereby achieving effective energy conservation and reducing cost associated with the dehydration device.

In some embodiments, the processor may determine the judgmental characteristic index based on the characteristic parameters of the gasification fine slag to be dehydrated through the predetermined algorithm, making the dehydration process automized. Based on the predetermined condition satisfied by the judgmental characteristic index, the most suitable target dehydration device may be selected for dehydration to sufficiently reduce energy consumption. Based on the residual moisture content of the dehydrated gasification fine slag, whether to continue the dehydration task or end the dehydration task may be determined, which improves flexibility of the dehydrating process, enables dynamic adjustment of the dehydration process according to an actual situation, and improves the dehydration efficiency.

FIG. 2 is a schematic diagram illustrating an exemplary dehydration parameter determination model according to some embodiments of the present disclosure.

In some embodiments, as shown in FIG. 2, in response to a target dehydration device 211 being an ultrasonically coupled vacuum dehydration device or a vibratory hot press dehydration device, preferable dehydration parameters 230 may be determined by a dehydration parameter determination model 220 based on the target dehydration device 211, a current moisture content 212, an average particle size 214, a pore volume 215, and a dry basis ash content 213, the dehydration parameter determination model 220 being a machine learning model. Descriptions regarding the current moisture content, the average particle size, the pore volume, and the dry basis ash content may be found in FIG. 1, which are not repeated here.

The current moisture content refers to a moisture content of the gasification fine slag before entering the ultrasonically coupled vacuum dehydration device or the vibratory hot press dehydration device for dehydration.

In some embodiments, the dehydration parameter determination model may be any one or a combination of a deep neural network (DNN) model, a recurrent neural network (RNN) model, or an other customized model structure, etc.

The preferable dehydration parameters refer to operating parameters of the ultrasonically coupled vacuum dehydration device or the vibratory hot press dehydration device when the gasification fine slag is dehydrated.

In some embodiments, the preferable dehydration parameters may be related to the dehydration mode used for the gasification fine slag. For example, when the dehydration mode is ultrasonically coupled vacuum dehydration, the preferable dehydration parameters may include a vacuum degree, a service power of an ultrasonic generator, a single processing time, etc. As another example, when the dehydration mode is vibratory hot press dehydration, the preferable dehydration parameters may include a mechanical vibration force pressure intensity, a vibration frequency, a mechanical static pressure intensity, a single processing time, etc. Descriptions regarding the vacuum degree, the service power of the ultrasonic generator, the single processing time, the mechanical vibration force pressure intensity, the vibration frequency, and the mechanical static pressure intensity may be found in FIG. 1 and related descriptions thereof.

In some embodiments, the dehydration parameter determination model may be obtained by training a plurality of first training samples with first labels. In some embodiments, each set of training samples of the plurality of first training sample may include sample target dehydration devices, sample current moisture contents, sample average particle sizes, sample pore volumes, and sample dry basis ash contents. The first training samples may be obtained based on historical data of the ultrasonically coupled vacuum dehydration device or the vibratory hot press dehydration device.

In some embodiments, the first labels of the first training samples may be determined based on energy consumption and a dehydration amount. For example, the first labels of the first training samples may be dehydration parameters determined by weighted values obtained by weighting energy consumption and dehydration amount of the target dehydration device. Weights may be determined manually (e.g., if the energy consumption is prioritized, a weight corresponding to the energy consumption may be a greater than a weight corresponding to the dehydrating amount). For example, after the gasification fine slag is dehydrated by the sample target dehydration devices corresponding to a set of training samples based on different sets of dehydration parameters, the processor may determine a set of dehydration parameters with a largest weighted value after the energy consumption and the dehydration amount are weighted, and determine the set of dehydration parameters as the first labels corresponding to the set of training samples. The different sets of dehydration parameters may be obtained based on historical data.

In some embodiments, in response to the target dehydration device being the ultrasonically coupled vacuum dehydration device or the vibratory hot press dehydration device, the preferable dehydration parameters may be determined by the dehydration parameter determination model based on the target dehydration device, the current moisture content, the average particle size, the pore volume, and the dry basis ash content, which may take full advantage of the ultrasonically coupled vacuum dehydration device or the vibratory hot press dehydration device in respective dehydration intervals to achieve optimization of the dehydration process. At the same time, ineffective energy consumption may be avoided when the gasification fine slag is subjected to dehydration in the ultrasonically coupled vacuum dehydration device or the vibratory hot press dehydrating device, and the device continues to operate even when a corresponding maximum dehydration amount has reached.

Figure 3:
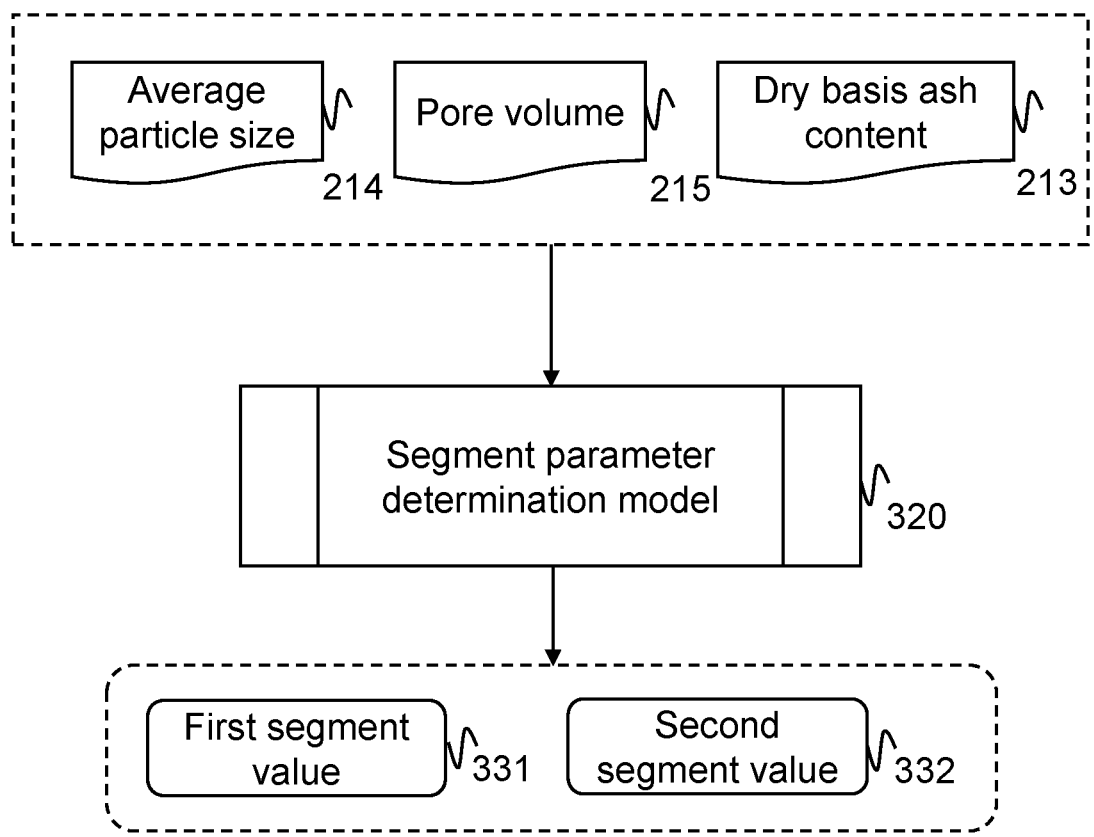
FIG. 3 is a schematic diagram illustrating an exemplary segment parameter determination model according to some embodiments of the present disclosure.

FIG. 3 is a schematic diagram illustrating an exemplary segment parameter determination model according to some embodiments of the present disclosure.

In some embodiments, as shown in FIG. 3, a predetermined condition may include a first segment value 331 and a second segment value 332. The processor may determine the first segment value 331 and the second segment value 332 based on the average particle size 214, the pore volume 215, and the dry basis ash content 213 through the segment parameter determination model 320, the segment parameter determination model 320 being a machine learning model. Descriptions regarding the first segment value, the second segment value, the average particle size, the pore volume, and the dry basis ash content may be found in FIG. 1, which are not repeated here.

In some embodiments, the segment parameter determination model may be any one or a combination of a deep neural network (DNN) model, a recurrent neural network (RNN) model, or an other customized model structure, etc.

In some embodiments, the segment parameter determination model may be obtained by training a plurality of second training samples with second labels. In some embodiments, each set of training samples of the plurality of second training samples may include sample average particle sizes, sample pore volumes, and sample dry basis ash contents. The plurality of second training samples may be obtained based on historical data. The second labels of the plurality of second training samples may be a first segment value and a second segment value corresponding to a lowest total energy consumption of a residual dehydration mode, i.e., a total energy consumption of one or more residual dehydration modes to be performed may be minimum under the first segment value and the second segment value. For example, the residual dehydration mode of the gasification fine slag may be that the gasification fine slag enters the vibratory hot press dehydration device and the ultrasonically coupled evaporative drying device for dehydration respectively, and the total energy consumption of the two residual dehydration modes may be minimum under the first segment value and the second segment value. The second labels of the plurality of second training samples may be obtained based on the historical data.

In some embodiments, a formula for calculating the judgmental characteristic index of the dehydration mode may be fixed, such as the formula (1) described above, i.e., one segment parameter determination model corresponds to one particular formula. For example, when indexes 1.16, 50, and other numbers in the formula (1) change, or a multiplication relationship or a division relationship in the formula (1) changes, the formula for calculating the judgmental characteristic index of the dehydration mode may change, and the segment parameter determination model may be re-trained to re-determine the first segment value and the second segment value.

In some embodiments, the accuracy of the determined first segment value and the determined second segment value may be improved. by the segment parameter determination model based on the average particle size, the pore volume, and the dry basis ash content. Moreover, a suitable dehydration device may be selected for dehydrating the gasification fine slag in different stages, thereby reducing the energy consumption.

Figure 5:
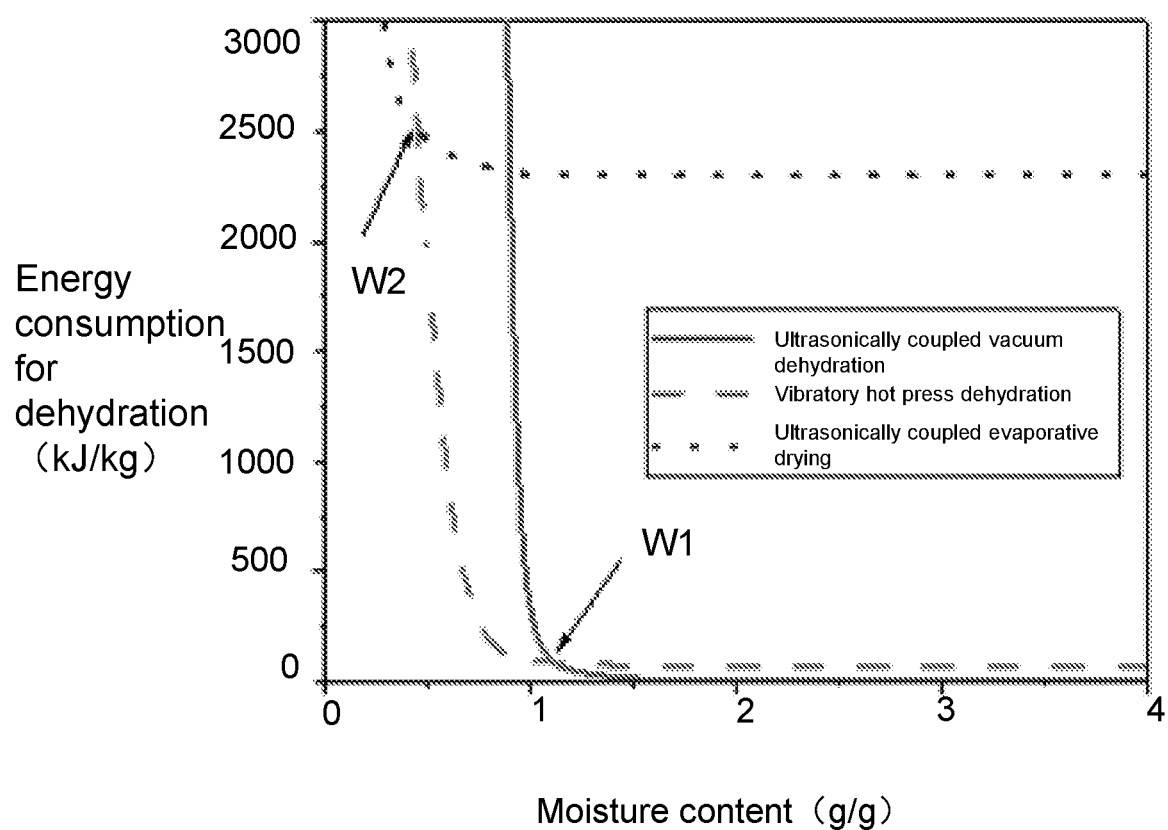
FIG. 5 is a schematic diagram illustrating exemplary energy consumption curves of an ultrasonically coupled vacuum dehydration process, a vibratory hot press dehydration process, and an ultrasonically coupled evaporative drying dehydration process of a gasification fine slag according to some embodiments of the present disclosure.

Compared to directly predicting moisture contents W1 and W2 of the gasification fine slag as shown in FIG. 5, by predicting the first segment value and the second segment value corresponding to the formula for calculating the judgmental characteristic index of the dehydration mode of the gasification fine slag, it is equivalent to combining a prediction of W1 and W2, and a prediction of a fitting deviation of the formula for calculating the judgmental characteristic index, to obtain a more preferable first segment value and a more preferable second segment value in a combined manner. More descriptions regarding W1 and W2 may be found in FIG. 5 and related descriptions thereof.

In some embodiments, in response to completing dehydration, the processor may determine a first segment value and a second segment value used for determining the target dehydration device next time based on the average particle size, the pore volume, the dry basis ash content, a current moisture content, and a set dehydration value through the segment parameter determination model. Descriptions regarding the current moisture content and the set dehydration value may be found in FIG. 1 and may not be repeated herein.

For example, when the gasification fine slag is dehydrated for the first time, the first segment value and the second segment value may be respectively x1 and y1; after a first dehydration process is completed, the processor may re-determine, based on the average particle size, the pore volume, the dry basis ash content, the current moisture content, and the set dehydration value of the gasification fine slag after the first dehydration process of the gasification fine slag is completed, a first segment value and a second segment value for a second dehydration process to be x2 and y2 by the segment parameter determining model, and determine the target dehydration device based on x2 and y2. Similarly, the processor may determine a first segment value and a second segment value to be x3 and y3 respectively for a third dehydration process, and determine the target dehydration device based on x3 and y3, etc.

In some embodiments, the segment parameter determination model may also be obtained by training a plurality of third training samples with third labels. The third labels of the plurality of third training samples may be a first segment value and a second segment value with the lowest total energy consumption corresponding to a residual dehydration mode in the current dehydration process (e.g., the second dehydration process mentioned above), which may be found in descriptions related to the second labels of the plurality of second training samples mentioned above. The plurality of third training samples may include sample average particle sizes, sample pore volumes, sample dry basis ash contents, sample current moisture contents, and sample set dehydration values, which may be obtained based on the historical data of the target dehydration device. Descriptions regarding the sample average particle sizes, the sample pore volumes, and the sample dry basis ash contents may be found hereinabove.

In some embodiments of the present disclosure, the first segment value and the second segment value used for determining the target dehydration device next time may be determined by the segment parameter determination model, and the corresponding first segment value and the corresponding second segment value in each dehydration process may be determined by automation of the segment parameter determination model, thereby determining the most suitable dehydration mode (i.e., the dehydration device) for dehydration in each dehydration process, and improving dehydration efficiency and reducing energy consumption.

Figure 4:
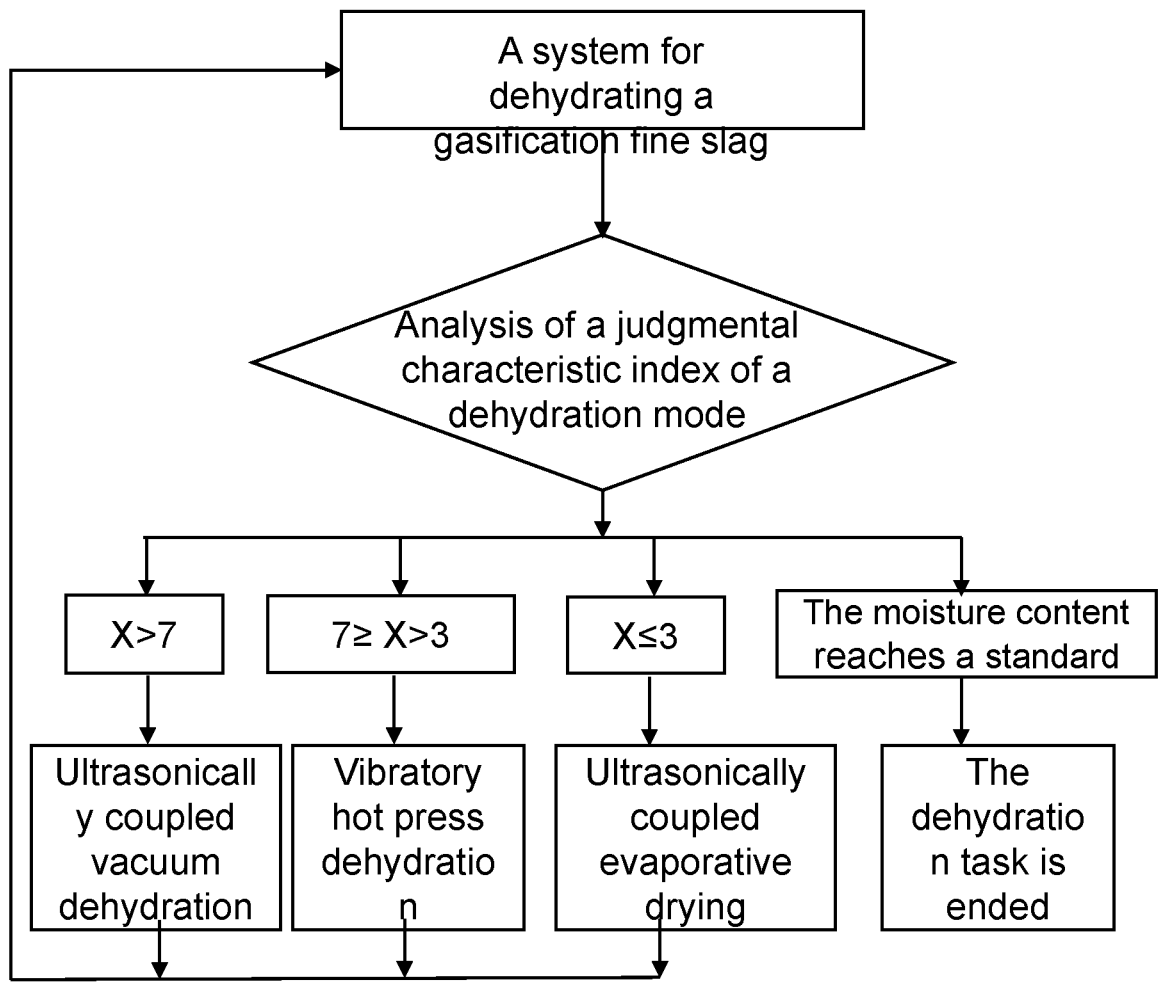
FIG. 4 is a flowchart illustrating an exemplary method for dehydrating a gasification fine slag based on multi-energy field gradient processing intelligent decision according to some embodiments of the present disclosure.

FIG. 4 a flowchart illustrating an exemplary method for dehydrating a gasification fine slag based on multi-energy field gradient processing intelligent decision according to some embodiments of the present disclosure.

As shown in FIG. 4, the method for dehydrating the gasification fine slag based on the multi-energy field gradient processing intelligent decision may use a combination of an ultrasonically coupled vacuum dehydration device, a vibratory hot press dehydration device, and an ultrasonically coupled evaporative drying device. A judgmental characteristic index of a dehydration mode may be analyzed through a system for dehydrating a gasification fine slag (which may also be referred to as a fully automated sample analysis system), including the following operations.

S1: For any gasification fine slag to be dehydrated, a first dehydration mode may be selected first.

S11: A moisture content W, an average particle size D, a pore volume V, and a dry basis ash content Ash of the gasification fine slag to be dehydrated may be determined.

In some embodiments, the pore volume V may be obtained through a BJH method.

In some embodiments, the judgmental characteristic index x of the dehydration mode may be calculated using a detection result according to the formula (1) described above.

S12: A corresponding first dehydration mode may be selected based on the judgmental characteristic index x of the dehydration mode.

When $x>7$, the gasification fine slag may enter the ultrasonically coupled vacuum dehydration device for dehydration (i.e., ultrasonically coupled vacuum dehydration).

In some embodiments, the processor of the ultrasonically coupled vacuum dehydration device may control a vacuum degree of a vacuum suction filter to be above 0.08 MPa, a service power of an ultrasonic generator to be 400 W, and a single processing time to be 60 S.

When $7 \geq x > 3$, the gasification fine slag may enter the vibratory hot press dehydration device for dehydration (i.e., vibratory hot press dehydration).

In some embodiments, in the vibratory hot press dehydration device, a mechanical vibration force pressure intensity may be set as 3 MPa, a vibration frequency may be set as 20 Hz, a mechanical static pressure intensity may be set as 8 MPa, and a single processing time may be set as 90 S.

When $x \leq 3$, the gasification fine slag may enter the ultrasonically coupled evaporative drying device for dehydration (i.e., ultrasonically coupled evaporative drying).

In some embodiments, a temperature of the ultrasonically coupled evaporative drying device may be 100° C. During a treatment process, a residual moisture content of the current gasification fine slag may be determined every 10 min by sampling until the moisture content reaches a set dehydration value.

S2: after completing a first dehydration process, a residual moisture content of the gasification fine slag may be detected and compared with the set dehydration value, and if dehydration requirements are satisfied (i.e., the moisture content reaches a standard), a dehydration task may be ended. Otherwise, the judgmental characteristic index x of the dehydration mode may be calculated again by the system for dehydrating the gasification fine slag, and the dehydration mode may be selected according to a condition of S12 to continue dehydrating until the gasification fine slag satisfies the dehydration requirements.

In the dehydration mode provided in the present disclosure, the dehydration process may be carried out in an order of ultrasonically coupled vacuum dehydration, vibratory hot press dehydration, and ultrasonically coupled evaporative drying dehydration. After the first dehydration process is completed, the judgmental characteristic index x of the dehydration mode may be used for auxiliary determination. That is, after the first dehydration process is completed, if the gasification fine slag in the ultrasonically coupled vacuum dehydration device satisfies the dehydration requirements, the dehydration task may be ended, otherwise, the gasification fine slag may continue to be sent to the vibratory hot press dehydration device for dehydration.

When the gasification fine slag in the vibratory hot press dehydration device satisfies the dehydration requirements, the dehydration task may be ended, otherwise, the gasification fine slag may continue to be sent to the ultrasonically coupled evaporative drying device for dehydration. When the gasification fine slag in the ultrasonically coupled evaporative drying device satisfies the dehydration requirements, then the dehydration task may be ended, otherwise, the gasification fine slag may continue to be sent to the ultrasonically coupled evaporative drying device until the dehydration requirements are satisfied.

For a defined dehydration mode (i.e., a defined target dehydration device), following operations may be performed.

When x>7, the gasification fine slag may enter the ultrasonically coupled vacuum dehydration device for dehydration. When a dehydration process of the ultrasonically coupled vacuum dehydration device is ended, whether the gasification fine slag satisfies the dehydration requirements may be determined. If the gasification fine slag satisfies the dehydration requirements, the dehydration task may be ended, otherwise, the gasification fine slag may continue to be sent to the vibratory hot press dehydration device for dehydration. When a dehydration process of the vibratory hot press dehydration device is ended, whether the gasification fine slag satisfies the dehydration requirements may be determined. If the gasification fine slag satisfies the dehydration requirements, the dehydration task may be ended, otherwise, the gasification fine slag may continue to be sent to the ultrasonically coupled evaporative drying device for dehydration. When a dehydration process of the ultrasonically coupled evaporative drying device is ended, whether the gasification fine slag satisfies the dehydration requirements may be determined. If the gasification fine slag satisfies the dehydration requirements, the dehydration task may be ended, otherwise, the gasification fine slag may continue to be sent to the ultrasonically coupled evaporative drying device for dehydration until the gasification fine slag satisfies the set dehydration requirements.

When 7≥x>3, the gasification fine slag may enter the vibratory hot press dehydration device for dehydration. When the dehydration process of the vibratory hot press dehydration device is ended, whether the gasification fine slag satisfies the dehydration requirements may be determined. If the gasification fine slag satisfies the dehydration requirements, the dehydration task may be ended, otherwise, the gasification fine slag may continue to be sent to the ultrasonically coupled evaporative drying device for dehydration. When the dehydration process of the ultrasonically coupled evaporative drying device is ended, whether the gasification fine slag satisfies the dehydration requirements may be determined. If the gasification fine slag satisfies the dehydration requirements, the dehydration task may be ended, otherwise, the gasification fine slag may continue to be sent to the ultrasonically coupled evaporative drying device for dehydration until the gasification fine slag satisfies the set dehydration requirements.

When x≤3, the gasification fine slag may enter the ultrasonically coupled evaporation drying device for dehydration. When the dehydration process of the ultrasonically coupled evaporative drying device is ended, whether the gasification fine slag satisfies the dehydration requirements may be determined. If the gasification fine slag satisfies the dehydration requirements, the dehydration task may be ended, otherwise, the gasification fine slag may continue to be sent to the ultrasonically coupled evaporative drying device for dehydration until the gasification fine slag satisfies the set dehydration requirements.

FIG. 5 is a schematic diagram illustrating exemplary energy consumption curves of an ultrasonically coupled vacuum dehydration process, a vibratory hot press dehydration process, and an ultrasonically coupled evaporative drying dehydration process of a gasification fine slag according to some embodiments of the present disclosure.

In a dehydration process of a gasification fine slag to be determined, energy consumption for dehydration (KJ/kg) of the ultrasonically coupled vacuum dehydration process, the vibratory hot press dehydration process, and the ultrasonically coupled evaporative drying dehydration process on the gasification fine slag may be determined respectively, and results may be shown in FIG. 5.

An intersection of an energy consumption curve of the ultrasonically coupled vacuum dehydration process with an energy consumption curve of the vibratory hot press dehydration process may be W1, and an intersection of the energy consumption curve of the vibratory hot press dehydration process with an energy consumption curve of ultrasonically coupled evaporative drying dehydration process may be W2. When a moisture content of the gasification fine slag is higher than W1, the ultrasonically coupled vacuum dehydration process may be a dehydration mode with a lowest energy consumption. When the moisture content of the gasification fine slag is lower than W1 and higher than W2, the vibratory hot press dehydration process may be the dehydration mode with the lowest energy consumption. When the moisture content of the gasification fine slag is lower than W2, the ultrasonically coupled evaporative drying dehydration process may be the dehydration mode with the lowest energy consumption.

Ideally, when the moisture content of the gasification fine slag is higher than W1, the ultrasonically coupled evaporative drying dehydration process may be used. When the gasification fine slag is dehydrated until the moisture content is reduced to W1, a subsequent dehydration mode may be converted from the ultrasonically coupled vacuum dehydration process to the vibratory hot press dehydration process. When the gasification fine slag is dehydrated until the moisture content is reduced to W2, the subsequent dehydration mode may be converted from the vibratory hot press dehydration process to the ultrasonically coupled evaporative drying dehydration process.

Values of W1 and W2 may be influenced by properties of the gasification fine slag, especially related to the pore volume, the average particle size, and the ash content.

Ten sets of gasification fine slags were selected, and the pore volumes, the average particle sizes, the ash contents, and W1 values and W2 values of each set were determined. The results were shown in Table 1 below.

TABLE 1

Experimental parameters of dehydrating the gasification fine slag of each set

| Sample No. | Pore volume (cm³/g) | Average particle size (45 μm) | Ash content (g/g) | W1 (g/g) | W2 (g/g) |
|---|---|---|---|---|---|
| 1 | 0.15 | 50 | 0.6 | 1.05 | 0.45 |
| 2 | 0.13 | 54 | 0.65 | 0.75 | 0.32 |
| 3 | 0.12 | 43 | 0.68 | 0.84 | 0.36 |
| 4 | 0.13 | 41 | 0.73 | 0.88 | 0.38 |
| 5 | 0.16 | 46 | 0.65 | 1.12 | 0.48 |
| 6 | 0.13 | 41 | 0.73 | 0.87 | 0.37 |

TABLE 1-continued

Experimental parameters of dehydrating the gasification fine slag of each set

| Sample No. | Pore volume (cm³/g) | Average particle size (45 µm) | Ash content (g/g) | W1 (g/g) | W2 (g/g) |
|---|---|---|---|---|---|
| 7 | 0.16 | 46 | 0.65 | 0.94 | 0.41 |
| 8 | 0.21 | 64 | 0.62 | 1.06 | 0.45 |
| 9 | 0.19 | 54 | 0.67 | 1.06 | 0.46 |
| 10 | 0.17 | 62 | 0.63 | 0.87 | 0.38 |

The pore volume of the gasification slag may be a storage space for internal moisture. The larger the pore volume, the higher the internal moisture content of the gasification fine slag, and the higher the corresponding W1 value and W2 value, and W1 value and the W2 value may be in a positively proportional to the pore volume. The larger the particle size of the gasification fine slag, the simpler the pore between particles, the easier the dehydration process, and the lower the corresponding W1 value and W2 value, and the W1 value and the W2 value may be in a power index relationship with a base average particle size. The ash content of the gasification fine slag may be mostly in a form of small spherical vitreous bodies, with simple surface structures and good hydrophobicity. The higher the ash content, the easier the dehydration process, and the lower the corresponding W1 value and W2 value, and the W1 value and the W2 value may be in a power index relationship with a base ash content.

In order to accurately determine the W1 value and the W2 value, and select an appropriate dehydration mode, the present disclosure provides a concept of the judgmental characteristic index x of the dehydration mode according to a large amount of experimental measurement data. The judgmental characteristic index x of the dehydration mode may be calculated by formula (2) as follows:

$$x = \frac{W}{V}\left(\frac{D}{50}\right)^a \left(\frac{Ash}{0.6}\right)^b \quad (2)$$

a=1.16, and b=1.32 may be obtained based on the experimental data. By substituting 1.16 and 1.32 to the formula (2), the formula (1) is obtained, that is, a formula for obtaining the judgmental characteristic index x of the dehydration mode described above.

For a determined gasification fine slag, after the judgmental characteristic index x of the dehydration mode is calculated by the formula (1) described above, a first dehydration process may be performed using a following mode.

When x>7, the gasification fine slag may enter the ultrasonically coupled vacuum dehydration device for treatment.

When 7≥x>3, the gasification fine slag may enter the vibratory hot press dehydration device for treatment.

When x≤3, the gasification fine slag may enter the ultrasonically coupled evaporative drying device for treatment.

After a single dehydration process is completed, moisture parameters of the gasification fine slag may be detected again and compared with the set dehydration value, and then whether a dehydration task is ended may be determined. Specifically, when the gasification fine slag in the ultrasonically coupled vacuum dehydration device satisfies dehydration requirements, the dehydration task may be ended, otherwise, the gasification fine slag may continue to be sent to the vibratory hot press dehydration device for dehydration. When the gasification fine slag in the vibratory hot press dehydration device satisfies the dehydration requirements, the dehydration task may be ended, otherwise, the gasification fine slag may continue to be sent to the ultrasonically coupled evaporative drying device for dehydration. When the gasification fine slag in the ultrasonically coupled evaporative drying device satisfies the dehydration requirements, the task may be ended, otherwise the gasification fine slag may continue to be sent to the ultrasonically coupled evaporative drying device until the gasification fine slag satisfies the dehydration requirements.

In the present disclosure, the dehydration process of the gasification slag may be segmented (i.e., a corresponding dehydration device may be selected according to a range of the judgmental characteristic index), and a dehydration mode (i.e., dehydration parameters) with the lowest energy consumption may be used in each stage. Therefore, compared to a single process, the moisture content of the gasification fine slag may be reduced to a target value while reducing the energy consumption for dehydration. In addition, in the segmented dehydration process, a limit value may be set in a first stage of dehydration and a second stage of dehydration, and a sample may not be completely dried. U Advantages of two stages in their respective dehydration intervals may be fully used with the dehydration mode, thereby realizing optimization of the dehydration process.

Merely by way of example, a sample of a gasification fine slag to be dehydrated is required to be dehydrated to a moisture content not higher than 0.25 g/g (i.e., 20% moisture).

The dehydration process is carried out using the dehydration mode.

S1: the moisture content W of the gasification fine slag to be dehydrated is determined to be 4.05 g/g (i.e., 80% moisture), the average particle size D is determined to be 45 µm, the pore volume V is determined to be 0.14 cm3/g, and the dry basis ash content Ash is determined to be 0.68 g/g, where the pore volume V is obtained through a BJH method.

A detection result is substituted into formula (1) to calculate the judgmental characteristic index x of the dehydration mode, and x is determined to be 30.20.

x>7, so the ultrasonically coupled vacuum dehydrating device is selected for a first dehydration process. A gasification fine slag raw material is transported to the ultrasonically coupled vacuum dehydration device, and the gasification fine slag is dehydrated by starting the ultrasonically coupled vacuum filtration device. After the dehydration process is ended, the moisture content of the gasification fine slag is detected to be 0.92 g/g, which does not satisfy the dehydration requirements, then the dehydration process continues.

The moisture content of 0.92 g/g is substituted into the dehydration mode again to determine the judgmental characteristic index x of the dehydration mode, and x is calculated to be 6.86. 7≥x>3, the gasification fine slag raw material is transported to the vibratory hot press dehydration device, and the gasification fine slag is dehydrated by starting the vibratory hot press dehydrating device. After the dehydration process is ended, the moisture content of the gasification fine slag is detected to be 0.39 g/g, which does not satisfy the dehydration requirements, then the dehydration process continues.

The moisture content of 0.39 g/g is substituted into the dehydration mode again to determine the judgmental characteristic index x of the dehydration mode, and x is calculated to be 2.91. x<3, the gasification fine slag raw material is transported to the ultrasonically coupled evaporative drying device, and the gasification fine slag is dehydrated by starting the ultrasonically coupled evaporative drying device. The moisture content of the current gasification fine slag is detected every 10 min, and the moisture content of the gasification fine slag is finally detected to be 0.23 g/g, which satisfies the dehydration requirements, then the dehydration task is ended, and a dehydrated gasification fine slag product is output.

Parameter settings and durations of the ultrasonically coupled vacuum dehydration device, the vibratory hot press dehydration device, and the ultrasonically coupled evaporative drying device mentioned above may be found in relevant descriptive conditions in FIG. 4.

Since the dehydration process of each stage of the gasification fine slag satisfies the lowest energy consumption mode of the energy consumption curve, the energy consumption for dehydration of the overall dehydration process may be minimum.

One or more embodiments of the present disclosure provide a system for dehydrating a gasification fine slag. The system may include a processor controlling a dehydration device and/or a detection device. The dehydration device may include at least one of an ultrasonically coupled vacuum dehydration device, a vibratory hot press dehydration device, and an ultrasonically coupled evaporative drying device. The detection device may be configured to detect at least one of physical properties or chemical properties of a gasification fine slag to be dehydrated. The processor may be configured to control the detection device to determine characteristic parameters of a gasification fine slag to be dehydrated, and determine, based on the characteristic parameters, a judgmental characteristic index of a dehydration mode of the gasification fine slag to be dehydrated, the characteristic parameters including at least one of a moisture content, an average particle size, a pore volume, and a dry basis ash content. The processor may be configured to determine, based on a predetermined condition satisfied by the judgmental characteristic index, a target dehydration device and control the target dehydration device to dehydrate the gasification fine slag to be dehydrated. The processor may be configured to control the detection device to determine a residual moisture content of a dehydrated gasification fine slag, and determine, based on the residual moisture content, whether to end a dehydration task. More details regarding the above may be found in FIG. 1 and related descriptions thereof.

In some embodiments, the processor may be further configured to obtain a detection result. The processor may be further configured to determine, based on the detection result obtained from the detection device, the judgmental characteristic index of the dehydration mode through a predetermined algorithm. In the predetermined algorithm, the judgmental characteristic index may be positively correlated to the moisture content, the average particle size and the dry basis ash content, and the judgmental characteristic index may be negatively correlated to the pore volume.

In some embodiments, the predetermined condition may include a first predetermined condition, a second predetermined condition and a third predetermined condition. The processor may be further configured to in response to the judgmental characteristic index satisfying the first predetermined condition, determine the target dehydration device to be an ultrasonically coupled vacuum dehydrating device and dehydrate the gasification fine slag to be dehydrated, the first predetermined condition being that the judgmental characteristic index is greater than a first segment value; in response to the judgmental characteristic index satisfying the second predetermined condition, determine the target dehydration device to be a vibratory hot press dehydration device and dehydrate the gasification fine slag to be dehydrated using the vibratory hot press dehydration device, the second predetermined condition being that the judgmental characteristic index is less than or equal to the first segment value and greater than a second segment value, and the first segment value is greater than the second segment value; and in response to the judgmental characteristic index satisfying the third predetermined condition, determine the target dehydrating device to be an ultrasonically coupled evaporative drying device and dehydrate the gasification fine slag to be dehydrated using the ultrasonically coupled evaporative drying device, the third predetermined condition being that the judgmental characteristic index is less than or equal to the second segmented value.

In some embodiments, the processor may be further configured to control the detection device to detect a residual moisture content of the dehydrated gasification fine slag and compare residual moisture content of the dehydrated gasification fine slag with a set dehydration value. The processor may be further configured to: in response to a comparison result meeting dehydration requirements, end the dehydration task; or in response to the comparison result not meeting the dehydration requirements, obtain the judgmental characteristic index of the dehydration mode again; and determine, based on the predetermined condition satisfied by the judgmental characteristic index, the target dehydration device, and continue dehydrating until the dehydrated gasification fine slag meets the dehydration requirements In some embodiments, the processor may be further configured to in response to the target dehydrating device being an ultrasonically coupled evaporative drying device, control the detection device to detect a residual moisture content of the current gasification fine slag based on a sampling interval; and determine, based on at least one historical residual moisture content and historical sampling interval, a current sampling interval.

In some embodiments, the processor may be further configured to in response to the target dehydrating device being an ultrasonically coupled vacuum dehydration device or a vibratory hot press dehydration device, determine, based on the target dehydration device, a current moisture content, the average particle size, the pore volume, and the dry basis ash content, preferable dehydration parameters through a dehydration parameter determination model, wherein the dehydrating parameter determination model is a machine learning model.

In some embodiments, the predetermined condition may include a first segment value and a second segment value. The processor may be further configured to determine, based on the average particle size, the pore volume, and the dry basis ash content, the first segment value and the second segment value through a segment parameter determination model, wherein the segment parameter determination model is a machine learning model.

One or more embodiments of the present disclosure provide a non-transitory computer-readable storage medium. The storage medium may store computer instructions. When a computer reads the computer instructions in the storage medium, the computer may perform the method for dehydrating the gasification fine slag described in any of the embodiments of the present disclosure.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for dehydrating a gasification fine slag based on multi-energy field gradient processing intelligent decision, wherein the method is performed by a processor controlling a dehydration device and/or a detection device, the dehydration device includes an ultrasonically coupled vacuum dehydration device, a vibratory hot press dehydration device, and an ultrasonically coupled evaporative drying device, the detection device is configured to detect physical properties and/or chemical properties of a gasification fine slag to be dehydrated, the method comprising:
    S1: for any gasification fine slag to be dehydrated, a first dehydration mode is selected first:
    S11: the detection device is controlled to determine a moisture content W, an average particle size D, a pore volume V, and a dry basis ash content Ash of the gasification fine slag to be dehydrated, and a judgmental characteristic index x of the dehydration mode is calculated based on a detection result obtained from the detection device through the following formula:

$$x = \frac{W}{V}\left(\frac{D}{50}\right)^{1.16}\left(\frac{Ash}{0.6}\right)^{1.32}$$

S12: a corresponding first dehydration mode is selected from a preset database based on the calculated judgmental characteristic index x of the dehydration mode, wherein the preset database being stored in the processor and/or other storage devices to which the processor is communicatively connected, and the preset database includes at least one or more preset dehydration mode:
    when $x>7$, the gasification fine slag enters the ultrasonically coupled vacuum dehydration device for dehydration;
    when $7 \geq x > 3$, the gasification fine slag enters the vibratory hot press dehydration device for dehydration;
    when $x \leq 3$, the gasification fine slag enters the ultrasonically coupled evaporative drying device for dehydration;
    S2: after a first dehydration process is completed, the detection device is controlled to detect a residual moisture content of the gasification fine slag and compare the residual moisture content of the gasification fine slag with a set dehydration value, and if dehydration requirements are satisfied, a dehydration task is ended; otherwise, the judgmental characteristic index x of the dehydration mode is calculated again, and the dehydration mode is selected according to a condition of S12 to continue dehydrating until the gasification fine slag satisfies the dehydration requirements.

2. The method of claim 1, wherein the pore volume is measured using a Barret Joyner Halenda (BJH) method.

3. The method of claim 1, wherein in the ultrasonically coupled vacuum dehydration device,
    the processor controls a vacuum degree of a vacuum suction filter to be above 0.08 MPa, service power of an ultrasonic generator to be 400 W, and a single processing time of the ultrasonically coupled vacuum dehydration device to be 60 S.

4. The method of claim 1, wherein in the vibratory hot press dehydration device,
    a mechanical vibration force pressure intensity of the vibratory hot press dehydration device is 3 MPa and a vibration frequency of the vibratory hot press dehydration device is 20 Hz, a mechanical static pressure intensity is 8 MPa, and a single processing time of the vibratory hot press dehydration device is 90 S.

5. The method of claim 1, wherein
    a temperature of the ultrasonically coupled evaporative drying device is 100° C., during processing, a residual moisture content of the current gasification fine slag is determined every 10 min by sampling until the moisture content reaches the set dehydration value, and the dehydration task is ended.

* * * * *